United States Patent [19]

Koenhen et al.

[11] Patent Number: 5,274,047
[45] Date of Patent: Dec. 28, 1993

[54] SEMIPERMEABLE COMPOSITE MEMBRANE, A PROCESS FOR THE MANUFACTURE THEREOF, AS WELL AS APPLICATION OF SUCH MEMBRANES FOR THE SEPARATIONS OF COMPONENTS IN AN ORGANIC LIQUID PHASE OR IN THE VAPOR PHASE

[75] Inventors: Dirk M. Koenhen, Dedemsvaart; Aloysius H. A. Tinnemans, Zeist, both of Netherlands

[73] Assignee: X-Flow B.V., Almelo, Netherlands

[21] Appl. No.: 839,186

[22] Filed: Feb. 21, 1992

[30] Foreign Application Priority Data

Feb. 21, 1991 [NL] Netherlands .................. 9100307

[51] Int. Cl.$^5$ .................. B01D 69/12; C08F 20/00
[52] U.S. Cl. .................. 525/329.7; 210/500.27; 210/500.35; 210/500.38; 210/500.42; 210/654; 427/244; 427/245; 521/64; 525/293; 525/296; 525/329.4; 525/330.7; 528/345; 528/350
[58] Field of Search .................. 525/329.7, 293, 296, 525/329.4, 330.7; 521/64; 528/345, 350; 210/654, 500.27, 500.35, 500.38, 500.42; 427/244, 245

[56] References Cited

U.S. PATENT DOCUMENTS 4,721,568 1/1988 Buys et al. .................. 210/500.38
5,039,421 8/1991 Linder et al. .................. 210/654

FOREIGN PATENT DOCUMENTS 0254556 1/1988 European Pat. Off. .

OTHER PUBLICATIONS

Abstract of Swiss Patent No. 470,430 (L'Oreal); English Language Abstract of Patents Abstracts of Japan, vol. 13, No. 190.
An English Abstract of Patents Abstracts of Japan, vol. 3, No. 95; Copy of Swiss Patent No. 470,430.

*Primary Examiner*—John Kight, III
*Assistant Examiner*—John M. Cooney, Jr.
*Attorney, Agent, or Firm*—Brooks Haidt Haffner & Delahunty

[57] ABSTRACT

Semipermeable composite membrane, with a porous carrier substrate, whereby said carrier substrate is provided with a polymer network obtained by polycondensation, especially interfacial polymerization, which is built up of at least one reactive polyfunctional monomer or oligomer or prepolymer or polymer, and at least one acid halide containing polymer.

The specialty of this semi-permeable composite membrane consists therein that the acid halide containing polymere itself is built up of one or more vinyl containing monomers.

The acid halide containing polymer is generally a copolymer of acryloylchloride $H_2C=CHCOCl$ or methacryloyl chloride $H_2C=C(CH13)COCl$ with one or more vinyl containing monomers.

Usually the vinyl containing monomer is an acrylate or an acrylamide or a mixture thereof.

The invention further relates to a process for the manufacture of such membranes, as well as a method for the separation of components in an organic liquid phase or in the vapor phase using a semipermeable composite membrane according to the invention.

34 Claims, No Drawings

SEMIPERMEABLE COMPOSITE MEMBRANE, A PROCESS FOR THE MANUFACTURE THEREOF, AS WELL AS APPLICATION OF SUCH MEMBRANES FOR THE SEPARATIONS OF COMPONENTS IN AN ORGANIC LIQUID PHASE OR IN THE VAPOR PHASE

The invention relates to a semipermeable composite membrane, with a porous carrier substrate, whereby said carrier substrate is provided with a polymer network, obtained by polycondensation, especially interfacial polymerization, which is built up of at least one reactive polyfunctional monomer or oligomer or prepolymer or polymer with as functional groups —$NHR_4$ ($R_4$=H or alkyl with $C_1$—$C_{20}$), —OH or —SH and at least one acid halide containing polymer with as functional groups —COX, —$SO_2X$, —$POXR_5$ or —$NR_6COX$, wherein X represents Cl, Br or I, while $R_5$ and $R_6$ each represent an alkoxy group or an alkyl group with 1–16 carbon atoms, preferably 1–5 carbon atoms, as well as to a process for the manufacture of such membranes and finally to a method for the separation of components in an organic liquid phase or in the vapour phase.

Such composite membranes suitable for reverse osmosis and obtained by interfacial polymerization, are already known. The article Evolution of Composite Reverse Osmosis Membranes of J. E. Cadotte, American Chemical Society, 1985, discloses for instance the development of a series of composite membranes, which have resulted in the commercial FT-30 membrane manufactured by interfacial polymerization of aromatic diamines in the aqueous phase with triacyl chlorides in the organic phase (page 279 and following), with as principal application desalination of aqueous solutions. Further, still reference may be made to the U.S. Pat. No. 4,721,568. For another good review it is referred to the U.S. Pat. No. 4,360,434 (Kawaguchi et al.). This patent describes amphoteric ion-permeable composite membranes and shows at page 32 which types of monomeric diacid chlorides may be applied therefore.

With the above described FT-30 membranes reverse osmosis tests have been carried out in non-aqueous systems, whereby the separation results obtained in a methanolic environment are listed in Table A.

From reverse osmosis test of the above FT-30 membrane in a non-aqueous system it follows that:
a. no n-hexane flux (1%, by weight, of n-docosane in n-hexane at room temperature and at 40 bar) is observable
b. there is no toluene flux (the same in toluene)
c. in a 1%, by weight, solution of PEG 300 in methanol a good retention for PEG 300 (93%) is found but a moderate methanol flux of 30 kg/(m².hour).

From these data the following conclusions may be drawn.

Applicant prepared composite membranes from aromatic diacid chlorides+aliphatic polyfunctional amines.

Such membranes have been submitted to reverse osmosis tests with the following result:
a. no n-hexane and no n-toluene flux
b. in methanol moderate to bad methanol fluxes 4–13 kg/(m².hour) and moderate retentions for PEG 300 (53–68%).

Subsequently membranes have been prepared from aliphatic diacid chlorides+aliphatic polyfunctional amines, with the following result:
a. no n-hexane and toluene flux; not even when large hydrophobic moieties are introduced, while using $ClOC(CH_2)_8COCl$
b. in some cases in methanol results may be obtained, which are comparable as in case of a FT-30 membrane (good retention/moderate flux); in some cases better flux values, but somewhat worse retentions (the latter is not desirable!).

From the above may be concluded that this type of membrane built up of aromatic and/or aliphatic diacid chlorides+polyfunctional (aromatic or) aliphatic amines is unsuitable for application in n-hexane ($C_5$-$C_8$ aliphatic) or toluene (aromatic) systems. On the other hand, in methanol good retentions may be obtained for PEG 300, but at low fluxes.

The known membranes with monomeric or oligomeric polyacid halides have further in general the disadvantage that they do not show a swelling, have a small mesh size, are rigid, and have a high polarity. Further, there are known composite membranes, which are built up of polymeric diacid chlorides+polyfunctional amine. In this respect mention is made of EP 0 254 556 (Bend Research Inc.). The polymeric diacid chloride comprises terminal acid chlorides with a polymeric middle part

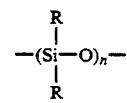

It is known that this middle part has a high affinity to n-hexane and toluene, and is therefore suitable for application in R.O. (reverse osmosis) composite membranes in this type of solvents. However, the used prepolymers based on siloxanes comprise as terminal groups —NCO.

The membranes described according to this European patent application are suitable for the separation of gases. Not a word is mentioned in the European patent application EP 0 254 556 about the application of such membranes for the separation of components in an organic liquid phase or in the vapor phase.

It is observed that the middle part

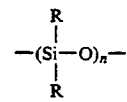

is responsible for the affinity of the top layer for RO separations in an organic environment. Beside the terminal acid chloride groups this is an essential limitation to tune the affinity of the top layer (and thus the flux and retention behavior) to the solvent stream wherein the separation takes place.

Now the invention intends to provide semipermeable composite membranes, which eliminate the disadvantages inherent to the known membranes and which are suitable for the separation of components in an organic liquid medium at a good flux and a good retention.

To this end the invention provides a semipermeable composite membrane, with a porous carrier substrate, whereby said carrier substrate is provided with a polymer network obtained by polymerization, especially by interfacial polymerization, which network is built up of at least one reactive polyfunctional monomer or oligomer or prepolymer or polymer with as functional groups —NHR$_4$(R$_4$=H or alkyl with C$_1$-C$_{20}$), —OH or —SH and at least one acid halide containing polymer with as functional groups —COX, —SO$_2$X, —POXR$_5$ or —NR$_6$COX, wherein X represents Cl, Br or I, while R$_5$ and R$_6$ each represent an alkoxy group or an alkyl group with 1-16 carbon atoms, preferably 1-5 carbon atoms, characterized in that the acid halide containing polymer itself is built up from one or more vinyl containing monomers.

Surprisingly it appeared that the semipermeable membranes according to the invention, which are novel, are especially suitable for the separation of components in an organic liquid phase or in the vapor phase, for instance polyethylene glycol in methanol, n-docosane in n-hexane, etc. Moreover the membranes according to the invention do not appear to show practically any swelling, they have a substantial mesh size, they are flexible, they have a larger affinity for organic liquids owing to a lower polarity.

In general the mole fraction of the acid halide containing monomer in the polymer amounts to 1-20 and preferably 5-11% in case of the semipermeable composite membranes according to the invention.

It has appeared that it may be favorable when the polymer network moreover comprises a reactive polyfunctional monomer or oligomer with as reactive groups —COX, —SO$_2$X, —POXR$_5$, —NR$_6$COX or NCO, wherein X represents Cl, Br or I, while R$_5$ and R$_6$ each represent an alkoxy group or an alkyl group with 1-6 carbon atoms, preferably 1-5 carbon atoms.

An example of an often used reactive polyfunctional monomer is isophthaloyl chloride.

According to the invention it is preferable when the acid halide containing polymer is a copolymer of acryloyl chloride H$_2$C=CHCOCl or methacryloyl chloride H$_2$C=C(CH$_3$)COCl with one or more vinyl containing monomers.

Especially favorable are those semipermeable composite membranes according to the invention, whereby the vinyl containing monomer is an acrylate with the formula

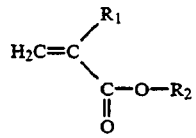

wherein R$_1$ and R$_2$, whether or not equal to each other, represent H, a C$_1$-C$_{20}$ alkyl, an aryl like phenyl, naphthyl, etc., while R$_2$ is whether or not substituted by an OH, halogen, siloxane, OR, wherein R is a whether or not substituted C$_1$-C$_{10}$ alkyl.

Moreover the semipermeable composite membranes according to the invention appear to satisfy properly when the vinyl containing monomer is an acryl amide with the formula

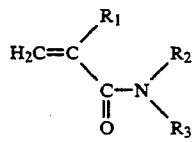

wherein R$_1$, R$_2$ and R$_3$, whether or not equal to each other, represent H, a C$_1$-C$_{20}$ alkyl, whether or not substituted by OH, halogen, etc., an aryl like phenyl, naphthyl.

Satisfactory separation results are obtained with membranes, wherein the vinyl containing monomer is isobutyl methacrylate, a mixture of isobutyl methacrylate and trifluorethyl acrylate, a mixture of isobutyl methacrylate and ethyl acrylate, a mixture of isobutyl methacrylate and N-vinyl-pyrrolidon, a mixture of isobutyl methacrylate and N-vinyl-N-methylacetamide, a mixture of isobutyl methacrylate and acrylic acid, methyl methacrylate, ethyl acrylate or 2-ethyl-hexyl acrylate.

Examples of other suitable vinyl containing monomers are N-vinyl pyrrolidon, vinyl acetate, butadiene, styrene, vinyl ethers like C=C—O—R, vinyl chloride, vinylidene chloride, isobutylene, acrylonitrile, vinyl pyridine.

Further the invention comprises a process for the manufacture of a semipermeable composite membrane by coating a porous substrate with a polymer network obtained by polycondensation, especially interfacial polymerization, characterized in that the porous substrate is treated with a solution of at least one reactive polyfunctional monomer or oligomer of prepolymer or polymer with as reactive groups —NHR$_4$(R$_4$=H or alkyl with C$_1$-C$_{20}$), —OH or —SH and possibly a surface active compound in water, after which the substrate treated in this manner is further treated with a solution of at least one acid halide containing polymer with as reactive groups —COX, —SO$_2$X, —POXR$_5$, —NR$_6$COX or —NCO, wherein X represents Cl, Br or I, while R$_5$ and R$_6$ each represent an alkoxy group or alkyl group with 1 to 16 carbon atoms, preferably 1 to 5 carbon atoms, in a suitable organic solvent, after which the substrate treated in this manner is dried and subsequently optionally subjected to a heat treatment.

Finally the invention extends to a method for the separation of components in an organic liquid phase or in a vapor phase using the above described semipermeable composite membranes according to the invention.

The invention is now further elucidated by the following non-limitative examples.

EXAMPLE I

A wet flat support membrane of polyimide (0.30×0.18 m), prepared from a 16%, by weight, solution of a polyimide-type (Lenzing, p84) in DMF, was applied to a cylindrical body manufactured of polyethylene. This support membrane was dipped for 15 minutes in an aqueous phase with 1.0%, by weight, H2N—CH2—CH2—CH2—NH—CH2—CH2—N-H—CH2—CH2—CH2—NH2 (N4) as polyfunctional monomer and 0.04%, by weight, of sodium dodecyl sulphate as surface active compound. Then the membrane was taken out of the aqueous phase, after which the excess of aqueous solution was removed with a rubber roller press. After about 1 minute the membrane was transported to an organic phase, consisting of toluene/chloroform (96/4 g/g) with dissolved therein 0.05%, by weight, of isotaloyl chloride (IPC) and 0.6%, by weight, of poly(isobutyl methacrylate-coacryloyl chloride) (molar proportion 95/5; η intrinsic viscosity 0.53 dl/g in aceton, c=0.5), obtained after complete conversion during solution polymerization of a solution of 53.7%, by weight, of the corresponding monomers in chloroform in the presence of 0.5 mol. % 2,2'-azobis (2-ethyl propionitrile) (AIBN) as a radical initiator. The membrane was for about 1 minute in the organic phase. Further the membrane was dried for about 3 minutes at room temperature, transferred to a flat glass plate and thereafter dried for 15 minutes in an air circulation oven at 90° C.

The reverse osmosis properties of this membrane were evaluated at room temperature at 40 bar in a solution of 1.0%, by weight, of polyethylene glycol (PEG 300, Fluka) in methanol with as a result a methanol flux of 89 kg/(m$^2$.hour) and a retention PEG 300 of 86%.

Comparative example Ia

The procedure of example I was repeated on the understanding that the organic phase contained, beside IPC, the non-reactive polymer poly(isobutyl methacrylate). In a reverse osmosis experiment as described in example I this membrane showed a methanol flux of 35 kg/(m$^2$.hour) and a retention PEG 300 of 81%. From the above the favorable effect of the acid chloride groups built into the polymer on the methanol flux and retention PEG 300 shows clearly.

Example II

In an analogous manner as described in example I a composite membrane was prepared. The organic phase, however, comprised toluene-hexane (14/86 g/g) with dissolved therein a copolymer built up of isobutyl methacrylate (i-BMA) and acryloyl chloride. As a control, example IIa, a composite membrane was made with as barrier layer poly(isobutyl methacrylate).

The results of the flux and retention tests of a reverse osmosis experiment in a 1.0%, by weight, solution of n-docosane in n-hexane, executed at room temperature and at 40 bar, are mentioned in Table B.

Example III

The procedure of example I was repeated on the understanding that the organic phase contained, beside 0.05%, by weight, IPC, 0.6%, by weight, of poly(isobutyl methacrylate-co-acryloyl chloride) (molar ratio 89/11; $\eta$ intrinsic 0.56 dl/g in aceton, c=0.5), obtained after complete conversion during solution polymerization of a 57%, by weight, solution of the corresponding monomers in chloroform in the presence of 0.5 mol. % AIBN as a radical initiator.

The results of the flux and retention tests showed a methanol flux of 99 kg/m$^2$.hour and a retention PEG 300 of 87%.

Example IV

In the manner described in example I a composite membrane was prepared. The organic phase consisted of freon, toluene, toluene/hexane (10/90 g/g), or toluene/chloroform The results of the flux and retention tests of 1.0%, by weight, solutions of n-docosane in n-hexane and in toluene and of a 1.0%, by weight, solution of PEG 300 in methanol, evaluated at room temperature and a pressure of 40 bars, are mentioned in Table C.

Example V

In the manner described in example I a composite membrane was prepared. The organic phase consisted of freon with dissolved therein 0.61%, by weight, of poly(isobutyl methacrylate-co-acryloyl chloride) (molar ratio 95/5; intrinsic 1.96 dl/g in aceton c=0.5), obtained after 65% conversion during solution polymerization of a 41.7%, by weight, solution of the corresponding monomers in chloroform in the presence of 0.03 mol. % of AIBN as a radical initiator. The aqueous phase comprised 1.0%, by weight, of one of the following polyfunctional amines, to wit H2N—(CH2—CH2—NH)$_n$—CH2—CH2—NH2 [n=0(2N), n=2(4N), n=4(6N)].

The results of the flux and retention tests, executed in a corresponding manner as described in example IV, are mentioned in table D.

Example VI

In the manner described in example V a composite membrane was prepared. The aqueous phase contained 1.0%, by weight, of the polyfunctional amine N4, as well as 1.0%, by weight, of triethyl amine as an acid binding agent. As a control a composite membrane was made without the addition of triethyl amine, comparative example Va. The flux and retention tests of a 1.0%, by weight, solution of n-docosane in n-hexane are mentioned in Table E.

From example VI and VIa follows that the addition of an acid scavenger to the aqueous phase has a considerable influence on both the retention n-docosane and the flux.

Comparison of the results of example IVa and VIa shows the influence of the molecular weight of the applied copolymer in the organic phase on both the n-hexane flux and the retention n-docosane.

Example VII

One acts in the manner described in example I in the preparation of a composite membrane. However, the organic phase consisted of toluene/n-hexane with dissolved therein a copolymer, built up of isobutyl methacrylate (i-BMA), 1,1,1-trifluor ethyl acrylate (TFEA) and acryloyl chloride (AC), obtained after a substantially quantitative conversion during solution polymerization of a 30.7–31.5%, by weight, solution of the corresponding monomers in chloroform in the presence of 0.5 mol. % AIBN as a radical initiator.

The flux and retention tests of a 1.0%, by weight, solution of n-docosane in n-hexane and in toluene are mentioned in Table F.

Example VIII

One acts in the manner described in example I in the preparation of a composite membrane. However, the organic phase consisted of toluene/n-hexane with dissolved therein a copolymer, built up of isobutyl methacrylate (i-BMA), ethyl acrylate (EA) and acryloyl chloride (AC), obtained after a substantially, quantative conversion during solution polymerization of a 36.9–49.6%, by weight, solution of the corresponding monomers in chloroform in the presence of 0.5 mol. % AIBN as a radical initiator.

The flux and retention tests, executed in a corresponding manner as in example VII, are mentioned in Table G.

Example IX

One acts in the manner described in example I in the preparation of a composite membrane. The organic phase consisted of toluene/n-hexane (42/58 g/g) with dissolved therein poly(isobutyl methacrylate-co-vinyl pyrrolidon-coacryloyl chloride) (molar ratio 90/5/5, $\eta$ intrinsic 0.44 dl/g in aceton, c=0.5), obtained after 85% conversion during solution polymerization of a 36.3%, by weight, solution of the corresponding monomers in chloroform in the presence of 0.5 mol. % HIBN as the radical initiator.

The flux and retention tests, executed in a corresponding manner as in example VII, give as a result in n-hexane a n-hexane flux of 49 kg/(m².hour) and a retention n-docosane of 52% and in toluene a toluene flux of 190 kg/(m².hour) and a retention n-docosane of 36%.

Example X

One acts in the manner described in example I in the preparation of a composite membrane. However, the organic phase consisted of toluene/n-hexane (77/23 g/g) with dissolved therein 0.64%, by weight, of poly(isobutyl methacrylate-co-N-vinyl-N-methyl acetamide-co-acryloyl chloride) (molar ratio 80/15/5, $\eta$ intrinsic 0.83 dl/g in aceton, c=0.5), obtained after 74% conversion during solution polymerization of a 71.6%, by weight, solution of the corresponding monomers in chloroform in the presence of 0.5 mol. % AIBN as the radical initiator.

The reverse osmosis properties of this membrane were evaluated in a corresponding manner as in example VII, in n-hexane with as a result a n-hexane flux of 37 kg/(m².hour) and a retention n-docosane of 71% and in toluene a toluene flux of 231 kg/(m².hour) and a retention n-docosane of 63%.

Example XI

One acts in the manner described in example I in the preparation of a composite membrane. The organic phase consisted of toluene with dissolved therein a copolymer built up of isobutyl methacrylate (i-BMA), acrylic acid (AZ) and acryloyl chloride, (AC), obtained after 89% conversion during solution polymerization of a 39.3%, by weight, solution of the corresponding monomers in chloroform in the presence of 0.5 mol. % AIBN as the radical initiator. As a control a composite membrane was made starting from poly-isobutyl methacrylate-co-acryloyl chloride) (molar ratio 95/5).

The flux and retention tests, executed in a corresponding manner as in example IV, are mentioned in Table H.

Example XII

One acts in the manner described in example I in the preparation of a composite membrane. The organic phase consisted of toluene with dissolved therein 1.57%, by weight, of poly(methyl methacrylate-co-acryloyl chloride); molar ratio 95/5; $\eta$ intrinsic (0.84 dl/g in aceton, c=0.5), obtained by solution polymerization of a 51.5%, by weight, solution of the corresponding monomers in chloroform in the presence of 0.5 mol. % AIBM as the radical initiator.

The flux and retention tests were executed in a corresponding manner as in example IV, with as a result a hexane flux of 0 kg/(m².hour), a toluene flux of 34 kg/(m².hour) and a retention n-docosane of 69%, and a methanol flux of 26 kg/(m².hour) and a retention PEG 300 of 68%.

Example XIII

One acts in the manner described in example I in the preparation of a composite membrane. The organic phase consisted of toluene with dissolved therein 1.94%, by weight, poly(2-ethylhexyl acrylate-co-acryloyl chloride); molar ratio 95/5; obtained after 91% conversion during solution polymerization of a 53.2%, by weight, solution of the corresponding polymers in chloroform in the presence of 0.5 mol. % AIBM as the radical initiator.

The flux and retention tests were executed in a corresponding manner as in example IV, with as a result a hexane flux of 0 kg/(m².hour), a toluene flux of 180 kg/(m².hour) and a retention n-docosane of 34%.

TABLE A

| Acid chloride in organic phase[1] | (perc., by weight,) | Amine in aqueous phase | (perc., by weight,) | R.O. test data[3] Retention PEG 300 (%) | Methanol flux kg/(m² · hour) |
|---|---|---|---|---|---|
| Trimesoyl chloride[2] | | m-phenylene diamine | | 93 | 30 |
| Trimesoyl chloride | 0.81 | PEI/n4 | 1/1 | 53 | 4 |
| Isophtaloyl chloride | 0.81 | " | | 68 | 12 |
| Isophtaloyl chloride | 0.74 | " | | 68 | 13 |
| Trimesoyl chloride | 0.07 | | | | |
| ClOC(CH₂)₂COCl | 0.81 | " | | 74 | 77 |
| ClOC(CH₂)₂COCl | 0.81 | " | | 51 | 116 |
| ClOC(CH₂)₂COCl | 0.81 | PEI/6N | 1/1 | 83 | 28 |
| ClOC(CH₂)₂COCl | 0,81 | N4 | 1 | 69 | 60 |

[1]1,1,2-trifluor trichlorethane
[2]Commerically obtainable FT-30 membrane (Film Tech)
[3]Composite membranes showed no n-hexane flux and no toluene flux in solutions containing 1 perc., by weight, of n-docosane

TABLE B

| | Copolymer i-BMA/AC | | | | n-hexane flux |
|---|---|---|---|---|---|
| Example | molar ratio | intr.* (dl/g) | perc., by weight, | retention n-docosane (%) | kg/m² · hour |
| IIa | 100/— | 0.48 | 0.54 | 38 | 22 |
| IIb | 98/2 | 0.44 | 0.62 | 67 | 21 |
| IIc | 95/5 | 0.53 | 0.65 | 73 | 18 |

*Evaluated in acetone, c = 0.5
From this example follows clearly the favourable effect of the building-in of acid chloride groups in the polymer on the hexane flux and the retention n-docosane.

TABLE C

| | | n-hexane | | toluene | | methanol | |
|---|---|---|---|---|---|---|---|
| Vb | Organic phase | retention n-docosane (%) | flux kg/(m² · hour) | retention n-docosane (%) | flux kg/(m₂ · hour) | retention PEG 300 (%) | flux kg/(m² · hour) |
| IVa | freon | | 0 | | nil | | 0 |
| IVb | toluene | 36 | 137 | 54 | 197 | | high |
| IVc | toluene/chloroform | 46 | 106 | 47 | 192 | | high |

TABLE C-continued

| Vb | Organic phase | n-hexane retention n-docosane (%) | n-hexane flux kg/(m²·hour) | toluene retention n-docosane (%) | toluene flux kg/(m₂·hour) | methanol retention PEG 300 (%) | methanol flux kg/(m²·hour) |
|---|---|---|---|---|---|---|---|
| IVd | (96/4 g/g) toluene/ n-hexane (10/90 g/g) | 0 | | 77 | 87 | 82 | 71 |

This example clearly demonstrates the large influence of the used organic phase on the organic solvent flux and the retention behaviour.

TABLE D

| Example | Amine | n-hexane retention n-docosane % | n-hexane flux kg/(m²·hour) | toluene retention n-docosane % | toluene flux kg/(m²·hour) | methanol retention PEG 300 % | methanol flux kg/(m²·hour) |
|---|---|---|---|---|---|---|---|
| Va | 2N | 66 | 181 | 27 | 216 | 81 | 148 |
| Vb | 4N | 73 | 99 | 24 | 291 | 74 | 100 |
| Vc | 6N | 78 | 82 | 21 | 262 | 58 | 169 |

TABLE E

| Example | triethyl amine perc., by weight, | n-hexane retention n-docosane | n-hexane flux (kg/m²·hour) |
|---|---|---|---|
| VI | 1,0 | 77 | 65 |
| VIa | — | 56 | 147 |

TABLE F

| Vb | Organic phase solvent ratio (g/g) | copolymer i-BMA/TFEA/AC molar ratio | intr.* (dl/g) | perc., by weight, | n-hexane retention n-docosane (%) | n-hexane flux kg/(m²·h.) | toluene retention n-docosane (%) | toluene flux kg/(m²·h.) |
|---|---|---|---|---|---|---|---|---|
| VIIa | 16/84 | 95/—/5 | 0.53 | 0.53 | 74 | 35 | 54 | 152 |
| VIIb | 20/80 | 70/25/5 | 0.52 | 0.62 | 85 | 10 | 77 | 108 |
| VIIc | 43/47 | 47/48/5 | 0.57 | 0.59 | | 0 | 85 | 57 |

*Evaluated in acetone, c = 0,5

TABLE G

| Vb | Organic phase solvent ratio (g/g) | copolymer i-BMA/TFEA/AC molar ratio | intr.* (dl/g) | perc., by weight, | n-hexane retention n-docosane (%) | n-hexane flux kg/(m²·h.) | toluene retention n-docosane (%) | toluene flux kg/(m²·h.) |
|---|---|---|---|---|---|---|---|---|
| VIIa | 16/84 | 95/—/5 | 0.53 | 0.53 | 74 | 35 | 54 | 152 |
| VIIIa | 23/76 | 72/23/5 | 0.47 | 0.59 | | nil | 81 | 59 |
| VIIIb | 70/30 | —/95/5 | 0.84 | 0.59 | | 0 | 60 | 138 |

*Evaluated in acetone, c = 0,5

TABLE H

| Vb | Copolymer i-BMA/AZ/AC Molar ratio | intr.* | perc., by weight, | toluene retention n-docosane (%) | toluene flux kg/(m²·h.) | methanol retention n-docosane (%) | methanol flux kg/(m²·h.) |
|---|---|---|---|---|---|---|---|
| XIa | 95/—/5 | 0,53 | 1,84 | | nil | | |
| XIb | 95/—/5 | 1,96 | 1,89 | | nil | | 0 |
| XIc | 93/2/5 | | 1,79 | 77 | 42 | 64 | 27 |

*Evaluated in acetone, c = 0,5

We claim:

1. A semipermeable composite membrane for the separation of components in an organic liquid phase, said membrane having a porous carrier substrate, wherein said carrier substrate has a polymer network obtained by polycondensation of (A) at least one reactive polyfunctional monomer, oligomer, prepolymer or polymer having —NHR₄, —OH or —SH as functional groups, wherein R₄ is H or an $C_1$-$C_{20}$ alkyl and (B) at least one or more acid halide containing polymers having —COX, —SO₂X, —POXR₅ or —NR₆COX functional groups,
wherein X represents Cl, Br or I, and
wherein R₅ and R₆ each represent an alkoxy or alkyl group having 1-16 carbon atoms,
characterized in that said acid halide containing polymer is a copolymer with one or more vinyl containing monomers, and said polymer network is void of functional groups of formula I:

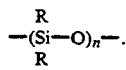

2. A semipermeable composite member according to claim 1, characterized in that said polycondensation is interfacial polymerization.

3. A semipermeable composite member according to claim 1, characterized in that $R_5$ and $R_6$ each represent an alkoxy or alkyl group having 1-5 carbon atoms.

4. A semipermeable composite membrane according to claim 1, characterized in that the mole fraction of said acid halide containing monomer in the polymer is 1-20%.

5. A semipermeable composite membrane according to claim 4, characterized in that the mole fraction of said acid halide containing monomer in the polymer is 5-11%.

6. A semipermeable composite membrane according to claim 1, characterized in that the polymer network further comprises a reactive polyfunctional monomer or oligomer having —COX, —SO$_2$X, —POXR$_5$, —NR$_6$COX or —NCO as reactive groups,
wherein X represents Cl, Br or I, and
wherein $R_5$ and $R_6$ each represent an alkoxy or alkyl group having 1-16 carbon atoms.

7. A semipermeable composite membrane according to claim 6, characterized in that $R_5$ and $R_6$ each represent an alkoxy or alkyl group having 1-5 carbon atoms.

8. A semipermeable composite membrane according to claim 6, characterized in that the reactive polyfunctional monomer is isophthaloyl chloride.

9. A semipermeable composite membrane according to claim 1, characterized in that the acid halide containing polymer is a copolymer of acryloyl chloride H$_2$C=CHCOCl or methacryloyl chloride H$_2$C=C(CH$_3$)COCl having one or more vinyl monomers.

10. A semipermeable composite membrane according to claim 1, characterized in that the vinyl containing monomer is an acrylate with the formula:

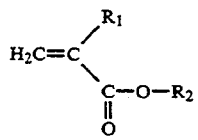

wherein $R_1$ and $R_2$ represent H, an C$_1$-C$_{20}$ alkyl, or an aryl.

11. A semipermeable composite membrane according to claim 10, characterized in that said aryl is phenyl.

12. A semipermeable composite membrane according to claim 10, characterized in that said aryl is naphthyl.

13. A semipermeable composite membrane according to claim 10, characterized in that $R_2$ represents OH, halogen, siloxane or alkoxy.

14. Semipermeable composite membrane according to claim 10, characterized in that the vinyl containing monomer is isobutyl methacrylate.

15. Semipermeable composite membrane according to claim 10, characterized in that the vinyl containing monomer is a mixture of isobutyl methacrylate and trifluorethyl acrylate.

16. Semipermeable composite membrane according to claim 10, characterized in that the vinyl containing monomer is a mixture of isobutyl methacrylate and ethyl acrylate.

17. Semipermeable composite membrane according to claim 10, characterized in that the vinyl containing monomer is a mixture of isobutyl methacrylate and N-vinyl pyrrolidone.

18. Semipermeable composite membrane according to claim 10, characterized in that the vinyl containing monomer is a mixture of isobutyl methacrylate and N-vinyl-N-methyl acetamide.

19. Semipermeable composite membrane according to claim 10, characterized in that the vinyl containing monomer is a mixture of isobutyl methacrylate and acrylate acid.

20. Semipermeable composite membrane according to claim 10, characterized in that the vinyl containing monomer is methyl methacrylate.

21. Semipermeable composite membrane according to claim 10, characterized in that the vinyl containing monomer is ethyl acrylate.

22. Semipermeable composite membrane according to claim 10, characterized in that the vinyl containing monomer is 2-ethylhexyl acrylate.

23. A semipermeable composite membrane according to claim 13, characterized in that said alkoxy is an C$_1$-C$_{10}$ alkoxy.

24. A semipermeable composite membrane according to claim 1, characterized in that the vinyl containing monomer is an acryl amide with the formula:

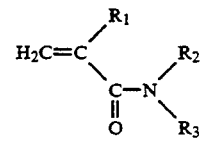

wherein one or more $R_1$, $R_2$ and $R_3$ represent H or an C$_1$-C$_{20}$ alkyl.

25. A semipermeable composite membrane according to claim 24, characterized in that one or more $R_1$, $R_2$ and $R_3$ represent OH, halogen or aryl.

26. A semipermeable composite membrane according to claim 25, characterized in that one or more of said $R_1$ or $R_2$ is aryl.

27. A semipermeable composite membrane according to claim 26, characterized in that said aryl is phenyl.

28. A process for the manufacture of a semipermeable composite membrane for the separation of components in an organic liquid phase by coating a porous substrate with a polymer network which is void of functional groups of formula I:

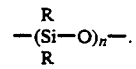

Formula I obtained by polycondensation, characterized in that:
the porous substrate is treated in a first treatment with a solution of at least one reactive polyfunctional monomer, oligomer, prepolymer or polymer having —NHR$_4$, —OH or —SH as functional groups, wherein R$_4$ is a H or a C$_1$-C$_{20}$ alkyl;
after which the substrate is further treated in a second treatment with a solution of at least one acid halide containing polymer with —COX, —SO$_2$X, —POXR$_5$, —NR$_6$COX or —NCO as reactive groups, wherein X represents Cl, Br or I, and
wherein $R_5$ and $R_6$ each represent an alkoxyl or alkyl group having 1-16 carbon atoms and wherein said acid halide containing polymer is a copolymer with one or more vinyl containing monomers in a suitable organic solvent; and
after which the substrate is dried.

29. A process for the manufacture of a semipermeable composite membrane according to claim 28, characterized in that said polycondensation is interfacial polymerization.

30. A process for the manufacture of a semipermeable composite membrane according to claim 28, characterized in that the solution in said first treatment includes a surface active compound in water.

31. A process for the manufacture of a semipermeable composite membrane according to claim 28, characterized in that $R_5$ and $R_6$ each represent an alkoxyl or alkyl group with 1-5 carbon atoms.

32. A process for the manufacture of a semipermeable composite membrane according to claim 28, characterized in that said process further includes a subsequent heat treatment.

33. A process for the separation of components in an organic liquid or vapor phase using a semipermeable composite membrane with a porous carrier substrate on which an applied polymer network is obtained by polycondensation, characterized in that the organic liquid or vapor phase is contacted with a semipermeable composite membrane according to claim 1.

34. Method for the separation of components according to claim 33, characterized in that said polycondensation is interfacial polymerization.

* * * * *